US012618994B2

(12) United States Patent
Caprioli et al.

(10) Patent No.: US 12,618,994 B2
(45) Date of Patent: May 5, 2026

(54) DATA-DRIVEN SEPARATION OF UPGOING FREE-SURFACE MULTIPLES FOR SEISMIC IMAGING

(71) Applicant: Schlumberger Technology Corporation, Sugar Land, TX (US)

(72) Inventors: Philippe Caprioli, Crawley (GB); Paal Kristiansen, Lysaker (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 290 days.

(21) Appl. No.: 18/563,023

(22) PCT Filed: May 21, 2021

(86) PCT No.: PCT/US2021/033690

§ 371 (c)(1),
(2) Date: Nov. 21, 2023

(87) PCT Pub. No.: WO2022/245372

PCT Pub. Date: Nov. 24, 2022

(65) Prior Publication Data

US 2024/0241279 A1 Jul. 18, 2024

(51) Int. Cl.

*G01V 1/36* (2006.01)
*G01V 1/24* (2006.01)
*G01V 1/28* (2006.01)

(52) U.S. Cl.

CPC .................. *G01V 1/36* (2013.01); *G01V 1/24* (2013.01); *G01V 1/282* (2013.01);
(Continued)

(58) Field of Classification Search

CPC ... G01V 2210/1423; G01V 2210/1427; G01V 2210/56; G01V 1/36; G01V 1/24; G01V 1/282
See application file for complete search history.

(56) References Cited

U.S. PATENT DOCUMENTS 8,559,266 B2 10/2013 Pica
9,110,191 B2 * 8/2015 Dragoset, Jr. ............ G01V 1/36
(Continued)

FOREIGN PATENT DOCUMENTS

EP 1474705 A1 11/2004
EP 2669713 A2 12/2013
(Continued)

OTHER PUBLICATIONS

Hampson and Szumski, "Down/down deconvolution", DownUnder GeoSolutions, EAGE Seabed Seismic Today: From Acquisition to Application, Sep. 2020, EAGE2020, 5 pages.
(Continued)

*Primary Examiner* — Krystine E Breier
(74) *Attorney, Agent, or Firm* — Kyle R. Miiller

(57) ABSTRACT

A method includes receiving seismic data including signals collected using a receiver, the seismic data representing a subsurface volume, identifying a downgoing wavefield and an upgoing wavefield in the seismic data, identifying direct arrivals in the downgoing wavefield, estimating at least first-order multiple reflection signals in the upgoing wavefield based on the downgoing wavefield, the upgoing wavefield, and the direct arrivals, and generating seismic images representing the subsurface volume based at least in part on the at least first-order multiple reflection signals.

15 Claims, 10 Drawing Sheets

(52) U.S. Cl.
CPC ................ *G01V 2210/1423* (2013.01); *G01V 2210/1427* (2013.01); *G01V 2210/56* (2013.01)

(56) References Cited

U.S. PATENT DOCUMENTS

| | | | | |
|---|---|---|---|---|
| 12,235,402 | B2 * | 2/2025 | Dawson | G01V 1/345 |
| 2003/0086335 | A1 | 5/2003 | Naville | |
| 2008/0162051 | A1 | 7/2008 | Ikelle | |
| 2009/0245022 | A1 * | 10/2009 | Dragoset, Jr. | G01V 1/36 367/24 |
| 2010/0135114 | A1 | 6/2010 | Teague | |
| 2010/0246324 | A1 * | 9/2010 | Dragoset, Jr. | G01V 1/36 367/24 |
| 2013/0163378 | A1 | 6/2013 | Poole | |
| 2013/0329520 | A1 | 12/2013 | van Borselen | |
| 2015/0109881 | A1 * | 4/2015 | Poole | G01V 1/364 367/7 |
| 2016/0109590 | A1 | 4/2016 | Goertz | |
| 2016/0238722 | A1 * | 8/2016 | Vdovina | G01V 1/282 |
| 2016/0313465 | A1 * | 10/2016 | Söllner | G01V 1/364 |
| 2017/0269247 | A1 | 9/2017 | Poole | |
| 2017/0285204 | A1 | 10/2017 | Hornman | |
| 2018/0059277 | A1 * | 3/2018 | Bloor | G01V 1/282 |
| 2019/0187313 | A1 | 6/2019 | Chemingui | |
| 2019/0257996 | A1 | 8/2019 | Takagi | |
| 2020/0217977 | A1 | 7/2020 | Halliday | |
| 2021/0011186 | A1 | 1/2021 | Cambois | |
| 2023/0077945 | A1 | 3/2023 | Dawson | |

FOREIGN PATENT DOCUMENTS

| | | | |
|---|---|---|---|
| GB | 2448415 | A | 10/2008 |
| WO | 2010065653 | A2 | 6/2010 |
| WO | 2017024112 | A1 | 2/2017 |

OTHER PUBLICATIONS

Backus, "Water Reverberations—Their Nature and Elimination", Geophysics, vol. XXIV, No. 2. pp. 233-261, Apr. 1959.

Search Report and Written Opinion of International Patent Application No. PCT/US2021/018120 on May 21, 2021; 12 pages.

Extended Search Report issued in European Patent Application No. 21757600.8 dated Feb. 7, 2024, 8 pages.

Lameloise, C. et al., "Broadband Depth Imaging from Separated Wavefields", 74th EAGE Conference Exhibition incorporating SPE EUROPEC 2012, 5 pages.

Extended Search Report issued in European Patent Application No. 21941004.0 dated Nov. 28, 2024, 8 pages.

Amundsen, L., "Wavenumber-based filtering of marine point-source data", Geophysics, 1993, 58(9), pp. 1335-1348.

Amundsen, L., "Elimination of free-surface related multiples without need of the source wavelet", Geophysics, 66, 2001, pp. 327-341.

Boiero, D. et al., "Up-down deconvolution in complex geological scenarios", Conference Proceedings, EAGE Seabed Seismic Today: from Acquisition to Application, 2020, p. 1-5.

Ford, R. et al., "Fast-turnaround OBS time-lapse processing enabled by up/down deconvolution: A North Sea case study", 89th Annual International Meeting, SEG, Expanded Abstracts, 2019, pp. 5280-5284.

Grion, S. et al., "Mirror imaging of OBS data", First Break , 2007, 25, 6 pages.

Lokshtanov, D., "Suppression of Free-surface Effects from Multicomponent Sea-floor Data", 62nd Annual International Conference and Exhibition, EAGE, Extended Abstracts, 2000, L-52, 4 pages.

Majdanski, M. et al., "Attenuation of free-surface multiples by up/down deconvolution for marine towed-streamer data", Geophysics, 2011, 76(6), pp. V129-V138.

Lecerf, D. et al. "Imaging primaries and high-order multiples for permanent reservoir monitoring: Application to Jubarte field", The Leading Edge, 2015, pp. 824-828.

Richardson, A., "Seismic imaging using internal multiples and overturned waves", Doctoral dissertation, Massachusetts Institute of Technology, 2015, 205 pages.

Liu X., et al. "Imaging of first-order surface-related multiples by reverse-time migration" Geophysical Journal International, 2017, 208, pp. 1077-1087.

Search Report and Written Opinion of International Patent Application No. PCT/US2021/033690 dated Sep. 2, 2021, 11 pages.

* cited by examiner

500

Receive seismic data �словомⁱ 502

Separate a downgoing wavefield from an upgoing wavefield in the seismic data ~ 504

Estimate the direct arrivals in the downgoing wavefield ~ 506

508

Estimate first order multiples in the upgoing wavefield based on the upgoing wavefield, the downgoing wavefield, and the direct arrivals, without using a water-propagation model

512

Estimate first and higher order multiples in the upgoing wavefield based on the direct arrivals, the upgoing wavefield, and the downgoing wavefield, without using a water-propagation model Estimate second order multiples, separately from the first order multiples, based on the upgoing wavefield, the downgoing wavefield, and the direct arrivals, without using a water-propagation model

509

513

Remove source signature and ghosting effects by deconvolving the direct arrivals

514

Subtract the estimated multiples from the upgoing wavefield

Remove source signature and ghosting effects by deconvolving the direct arrivals

510

511

Image the first and/or second order multiples in the upgoing wavefield

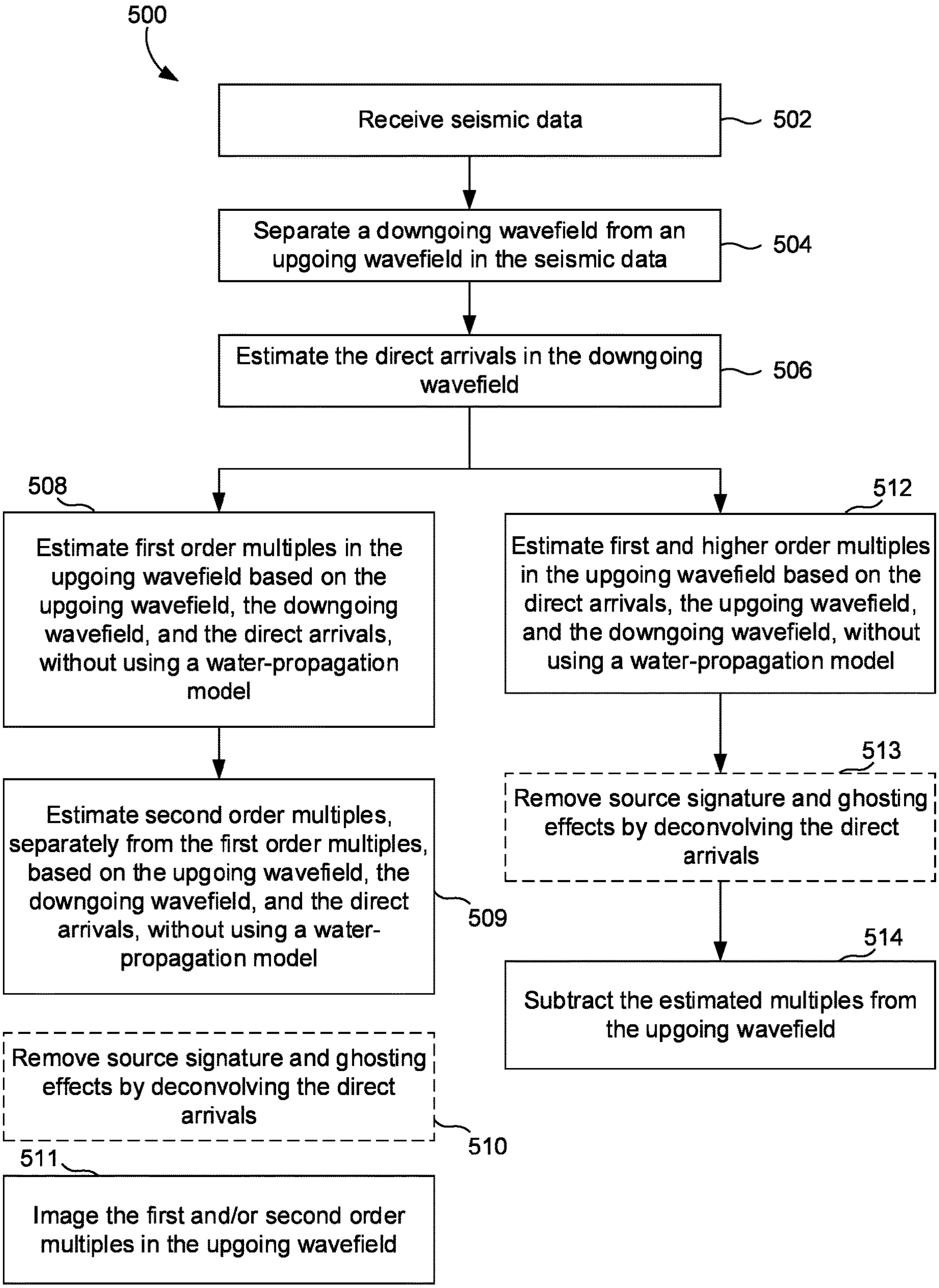

FIG. 5

DATA-DRIVEN SEPARATION OF UPGOING FREE-SURFACE MULTIPLES FOR SEISMIC IMAGING

Cross-Reference To Related Applications

This application is the National Stage Entry of International Application No. PCT/US2021/033690, filed May 21, 2021.

BACKGROUND

Ocean Bottom Seismometer (OBS), Ocean Bottom Cable (OBC), and Ocean Bottom Node (OBN) refer to types of marine seismic data acquisition systems. In these systems, generally, seismic receivers (hydrophones, geophones, etc.) are positioned at or near the ocean bottom, and a seismic source sends shots downward, from a shallower depth. This technique is often used to create recordings in a relatively quiet environment (in comparison to streamers) and/or where obstructions are present that may make using a streamer difficult.

Seismic data in this context, and in other marine and land-based contexts, may include a combination of several signals or wavefields. Generally, a "primary" reflection is the signal that is sought to be extracted from the recorded signal. The primary represents a seismic wave that is reflected from a subsurface reflector (generally an interface between two types of rock) and then detected by a receiver as it returns upwards. Another signal that may be present is a direct arrival. In the OBS/OBC/OBN context, this may generally be a signal that propagates from the source through the water and directly to the receiver, without being reflected. The seismic signals also generally include multiple reflection signals (or "multiples" for short). Multiple reflections occur when a downgoing seismic wave is reflected by a reflector, but before returning to the receiver, is reflected at least one more time, by a second reflector before finally propagating to the receiver. The second reflector can be subsurface or may be a "free surface", e.g., the ocean surface. Multiple reflections are often considered a type of noise and have been the subject of many different techniques to identify and remove them from the seismic data, e.g., without removing the desired primary signals.

Recently, it has been recognized that multiples also contain complementary information about the reflectivity of the subsurface. Accordingly, separating multiples and primaries is used to image the primaries without the multiples, but now also to image the multiples separately. Imaging of multiples has been shown to add value to the primary imaging particularly in areas where the illumination from the primaries is poor.

SUMMARY

Embodiments of the disclosure include a method that include receiving seismic data including signals collected using a receiver, the seismic data representing a subsurface volume, identifying a downgoing wavefield and an upgoing wavefield in the seismic data, identifying direct arrivals in the downgoing wavefield, estimating at least first-order multiple reflection signals in the upgoing wavefield based on the downgoing wavefield, the upgoing wavefield, and the direct arrivals, and generating seismic images representing the subsurface volume based at least in part on the at least first-order multiple reflection signals.

Embodiments of the disclosure include a non-transitory computer-readable medium storing instructions that, when executed by at least one processor of a computing system, cause the computing system to perform operations that include receiving seismic data including signals collected using a receiver, the seismic data representing a subsurface volume, identifying a downgoing wavefield and an upgoing wavefield in the seismic data, identifying direct arrivals in the downgoing wavefield, estimating at least first-order multiple reflection signals in the upgoing wavefield based on the downgoing wavefield, the upgoing wavefield, and the direct arrivals, and generating seismic images representing the subsurface volume based at least in part on the at least first-order multiple reflection signals.

Embodiments of the disclosure include a computing system that includes one or more processors and a memory system that includes one or more non-transitory computer-readable medium storing instructions that, when executed by at least one of the one or more processors, cause the computing system to perform operations that include receiving seismic data including signals collected using a receiver, the seismic data representing a subsurface volume, identifying a downgoing wavefield and an upgoing wavefield in the seismic data, identifying direct arrivals in the downgoing wavefield, estimating at least first-order multiple reflection signals in the upgoing wavefield based on the downgoing wavefield, the upgoing wavefield, and the direct arrivals, and generating seismic images representing the subsurface volume based at least in part on the at least first-order multiple reflection signals.

Thus, the computing systems and methods disclosed herein are more effective methods for processing collected data that may, for example, correspond to a surface and a subsurface region. These computing systems and methods increase data processing effectiveness, efficiency, and accuracy. Such methods and computing systems may complement or replace conventional methods for processing collected data. This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 5 illustrates a flowchart of a method for seismic imaging one or more upgoing multiples reflection signals, according to an embodiment.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 1A:
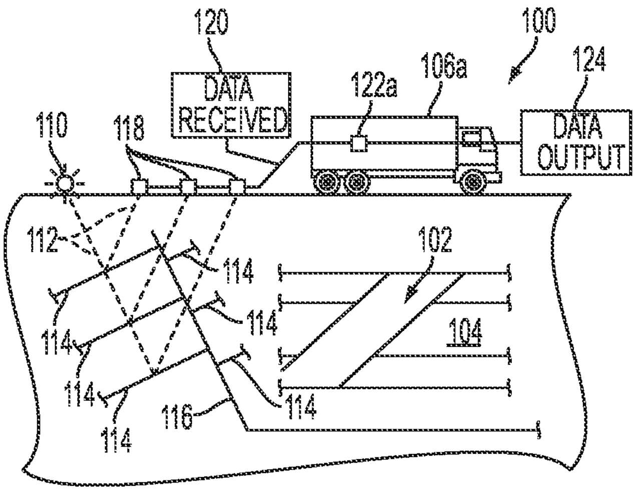
FIGS. 1A, 1B, 1C, 1D, 2, 3A, and 3B illustrate simplified, schematic views of an oilfield and its operation, according to an embodiment.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106*a*, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122*a* of a seismic truck 106*a*, and responsive to the input data, computer 122*a* generates seismic data output 124. This seismic data output may be stored, transmitted or further processed as desired, for example, by data reduction.

Figure 1B:
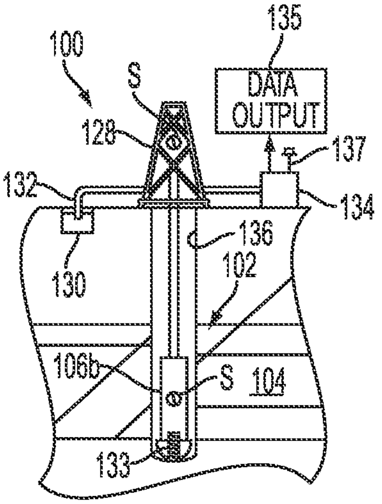

FIG. 1B illustrates a drilling operation being performed by drilling tools 106*b* suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106*b* may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figure 1C:
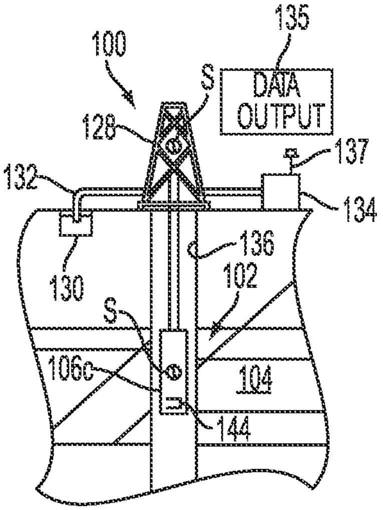

FIG. 1C illustrates a wireline operation being performed by wireline tool 106*c* suspended by rig 128 and into wellbore 136 of FIG. 1B. Wireline tool 106*c* is adapted for deployment into wellbore 136 for generating well logs, performing downhole tests and/or collecting samples. Wireline tool 106*c* may be used to provide another method and apparatus for performing a seismic survey operation. Wireline tool 106*c* may, for example, have an explosive, radioactive, electrical, or acoustic energy source 144 that sends and/or receives electrical signals to surrounding subterranean formations 102 and fluids therein.

Wireline tool 106*c* may be operatively connected to, for example, geophones 118 and a computer 122*a* of a seismic truck 106*a* of FIG. 1A. Wireline tool 106*c* may also provide data to surface unit 134. Surface unit 134 may collect data generated during the wireline operation and may produce data output 135 that may be stored or transmitted. Wireline tool 106*c* may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106*c* to measure downhole parameters which relate to, for example porosity, permeability, fluid composition and/or other parameters of the field operation.

Figure 1D:
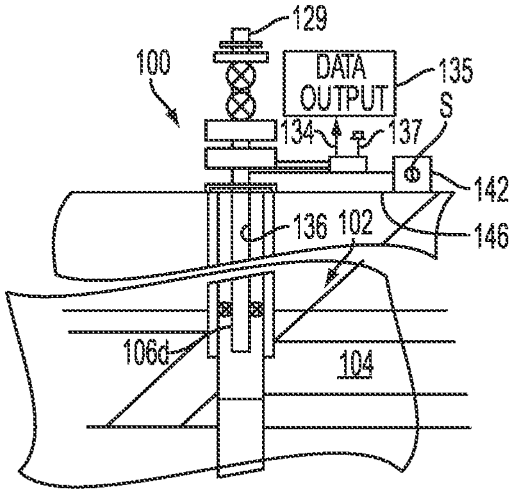

FIG. 1D illustrates a production operation being performed by production tool 106*d* deployed from a production unit or Christmas tree 129 and into completed wellbore 136 for drawing fluid from the downhole reservoirs into surface facilities 142. The fluid flows from reservoir 104 through perforations in the casing (not shown) and into production tool 106*d* in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106*d* or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
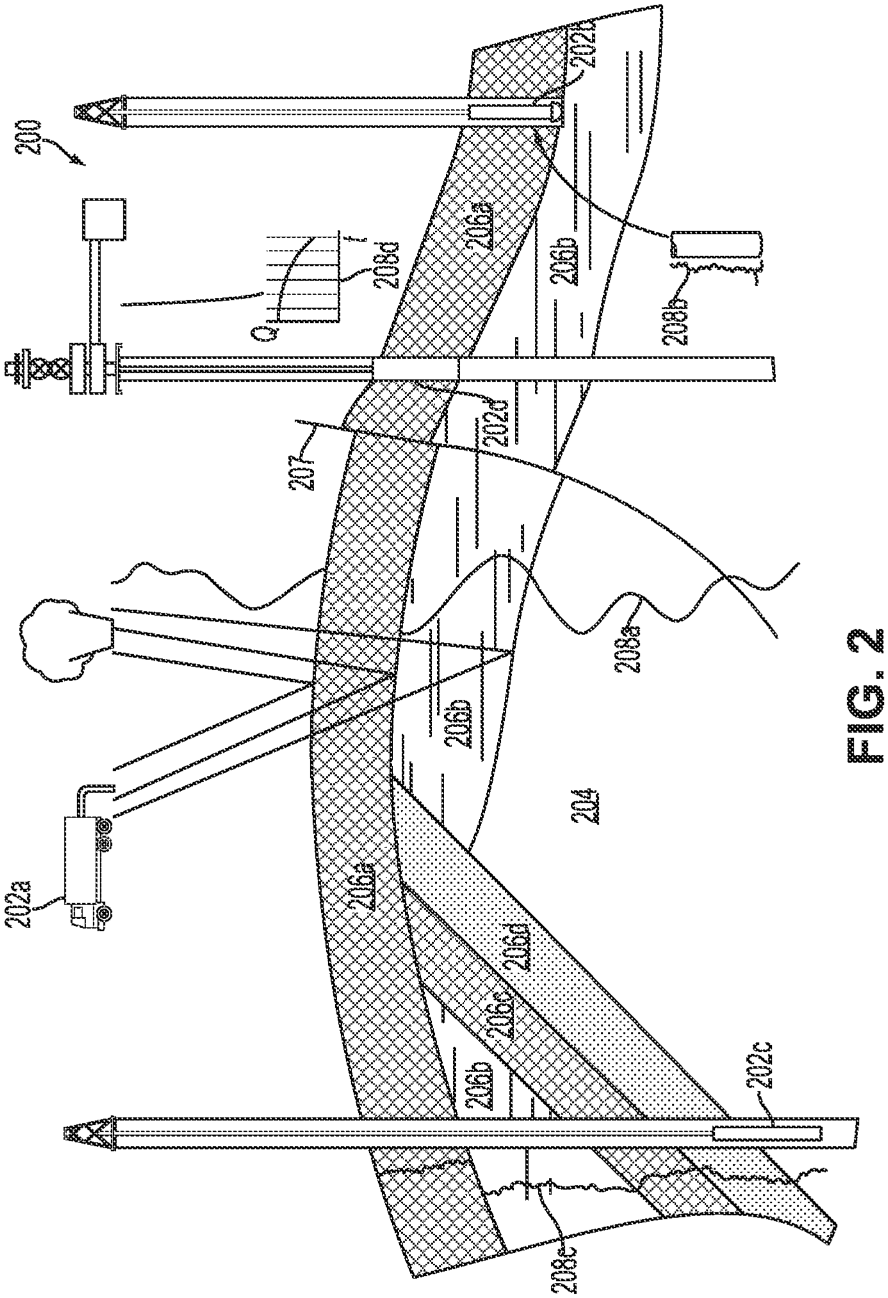

FIG. 2 illustrates a schematic view, partially in cross section of oilfield 200 having data acquisition tools 202*a*, 202*b*, 202*c* and 202*d* positioned at various locations along oilfield 200 for collecting data of subterranean formation 204 in accordance with implementations of various technologies and techniques described herein. Data acquisition tools 202*a*-202*d* may be the same as data acquisition tools 106*a*-106*d* of FIGS. 1A-1D, respectively, or others not depicted. As shown, data acquisition tools 202*a*-202*d* generate data plots or measurements 208*a*-208*d*, respectively. These data plots are depicted along oilfield 200 to demonstrate the data generated by the various operations.

Data plots 208*a*-208*c* are examples of static data plots that may be generated by data acquisition tools 202*a*-202*c*, respectively; however, it should be understood that data plots 208*a*-208*c* may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208*a* is a seismic two-way response over a period of time. Static plot 208*b* is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208*c* is a logging trace that typically provides a resistivity or other measurement of the formation at various depths.

A production decline curve or graph 208*d* is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206*a*-206*d*. As shown, this structure has several formations or layers, including a shale layer 206*a*, a carbonate layer 206*b*, a shale layer 206*c* and a sand layer 206*d*. A fault 207 extends through the shale layer 206*a* and the carbonate layer 206*b*. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208*a* from data acquisition tool 202*a* is used by a geophysicist to determine characteristics of the subterranean formations and features. The core data shown in static plot 208*b* and/or log data from well log 208*c* are typically used by a geologist to determine various characteristics of the subterranean formation. The production data from graph 208*d* is typically used by the reservoir engineer to determine fluid flow reservoir characteristics. The data analyzed by the geologist, geophysicist and the reservoir engineer may be analyzed using modelling techniques.

Figure 3A:
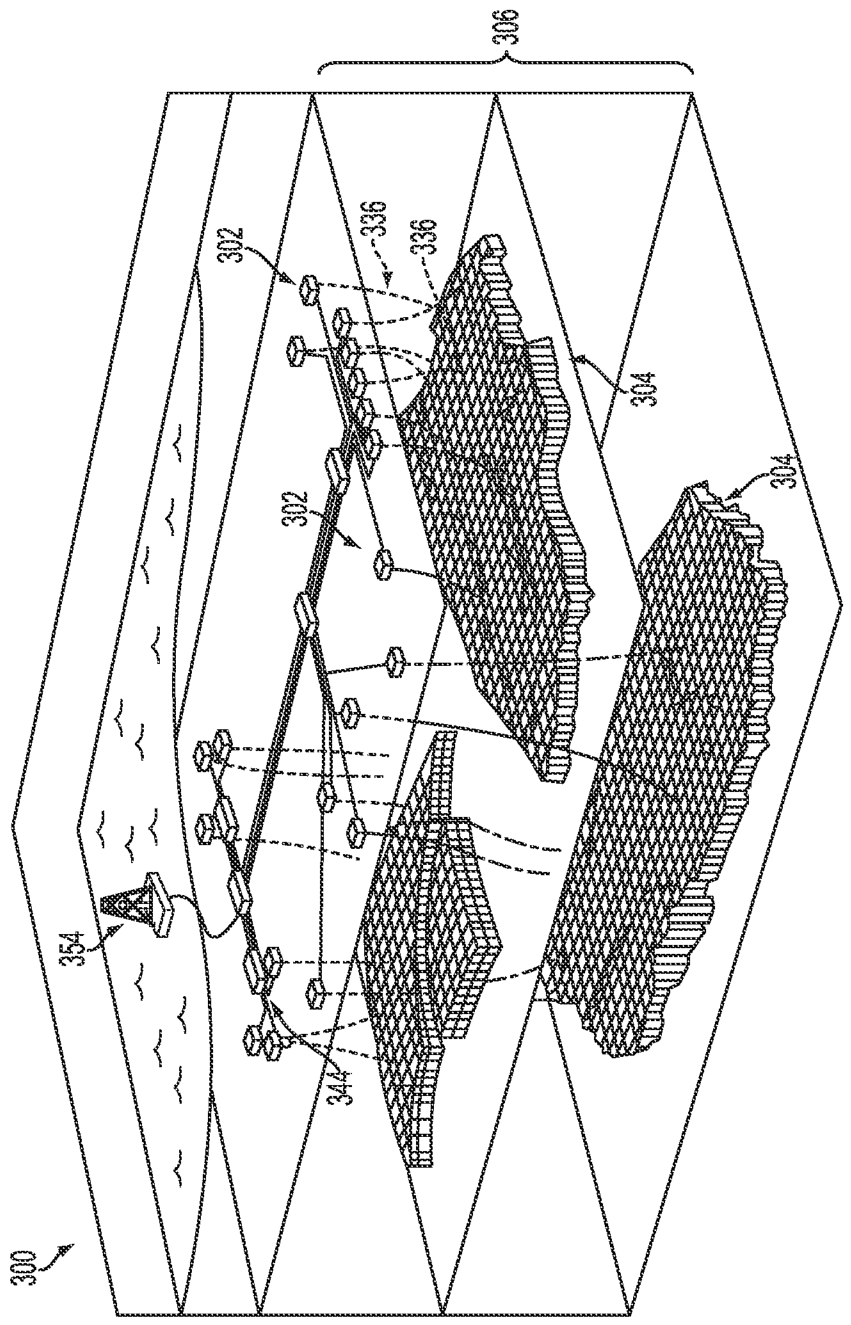

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
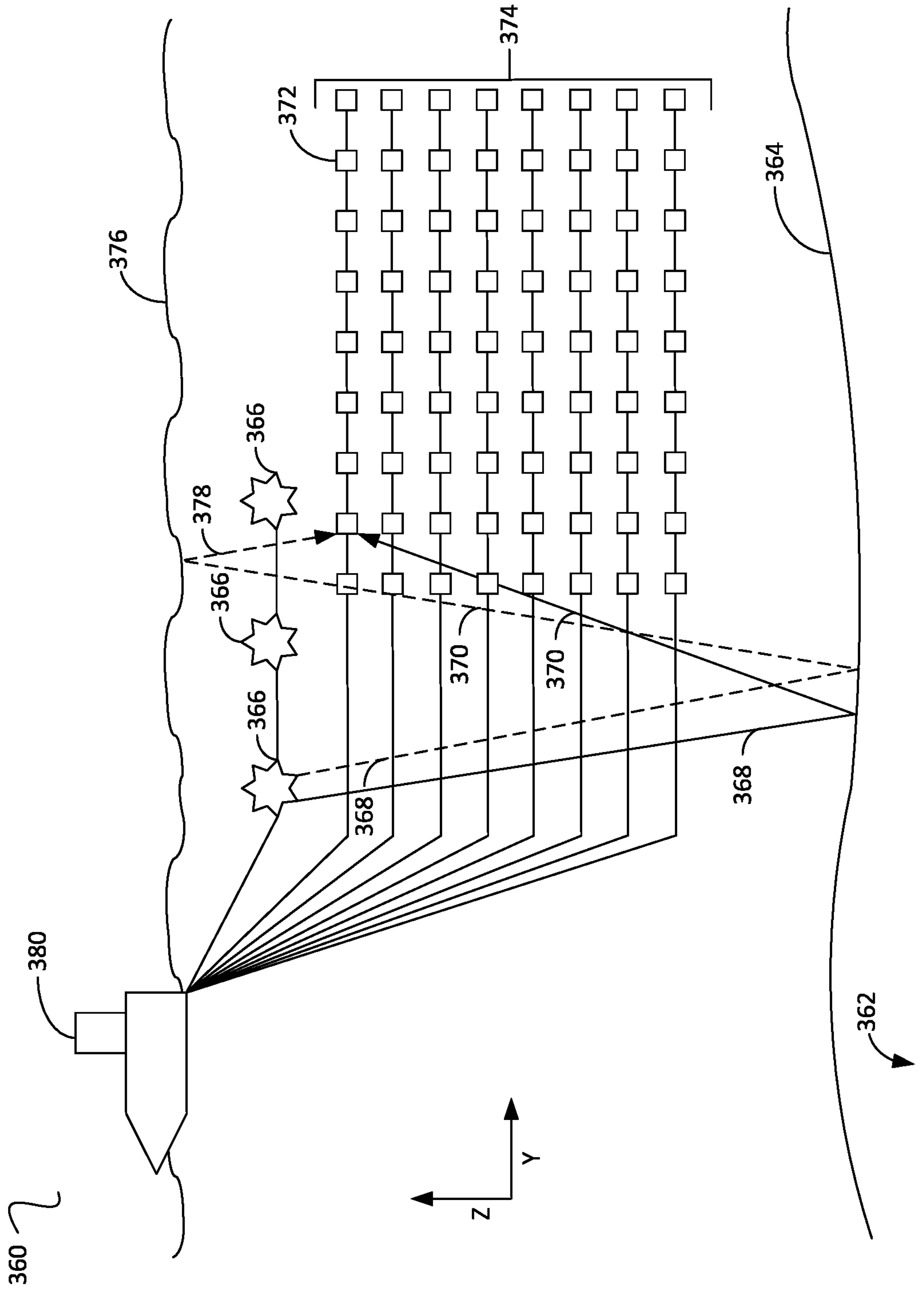

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

Multiple Reflections ("Multiples") Identification

In ocean bottom seismic data, the free surface multiple may be the strongest multiple in the data. For primary signal ("primaries") imaging, properly and efficiently removing such free surface multiples may be desired to avoid inaccurate imaging. Demultiple techniques generally involve a complex workflow that includes time-consuming parameter testing techniques.

Upgoing and downgoing wavefield deconvolution is a method for removing free surface multiples, as well as source ghost and signature effects on marine data. In general, the method may not call for assumptions as to the complexity of the subsurface, but may employ spatially well sampled upgoing and downgoing wavefields across sources and receivers. However, if the medium can be approximated as one-dimensional (1D), e.g., physical properties of the medium are a function of depth or are horizontally layered, the method greatly simplifies and can be conducted by a trace-by-trace deconvolution of the upgoing and downgoing wavefields in the plane-wave domain. For ocean-bottom node (OBN) seismic data, the plane-wave decomposition may then be built from the better sampled 3D common receiver gathers. This approach, known as up/down deconvolution (UDD), may be used for processing multi-component OBN data where the combination of recorded pressure and vertical velocity components yields the upgoing and downgoing wavefields.

Several formulations of UDD have been proposed. UDD can be formulated for directly predicting the data without free surface multiples, or for predicting upgoing free surface multiples or downgoing free surface multiples. In the latter approach, multiples that are identified may then be adaptively subtracted from upgoing or downgoing wavefields. Such an approach may offer some robustness against the 1D local medium approximation and against the noise.

Embodiments of the present disclosure may extend the prediction of upgoing and downgoing free surface multiples using data-based or data-driven operators as opposed to model-based operators. The embodiments disclosed herein may thus provide an improved prediction of the multiple wavefields, as the predictions may be less sensitive to the 1D medium assumption. More specifically, the prediction may become less sensitive to moderate deviations from a 1D propagation in the water layer. The downgoing arrival pressure wavefield may be employed for this technique, as will be described in greater detail below.

Upgoing/Downgoing Deconvolution

Figure 4B:
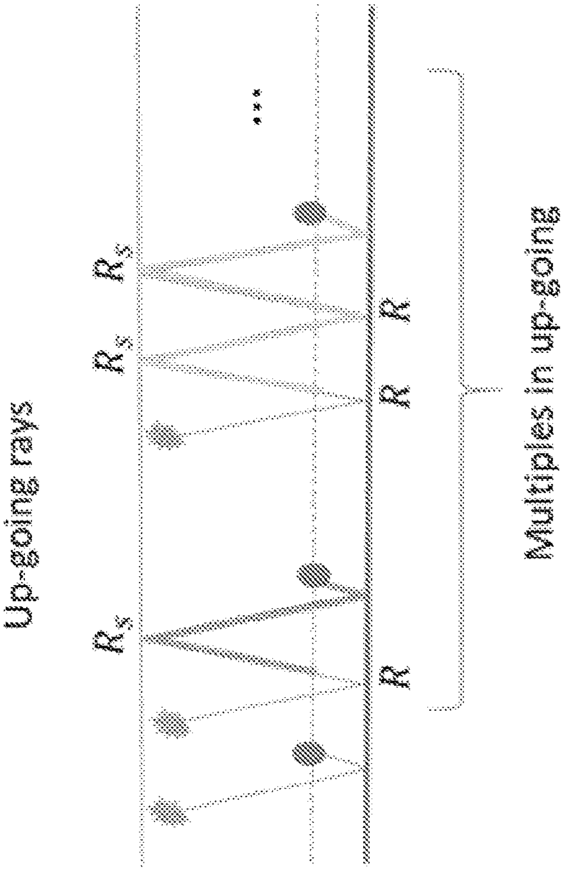
FIGS. 4A and 4B illustrate conceptual views of wavefields received at ocean bottom seismic receivers, according to an embodiment.
Figure 4A:
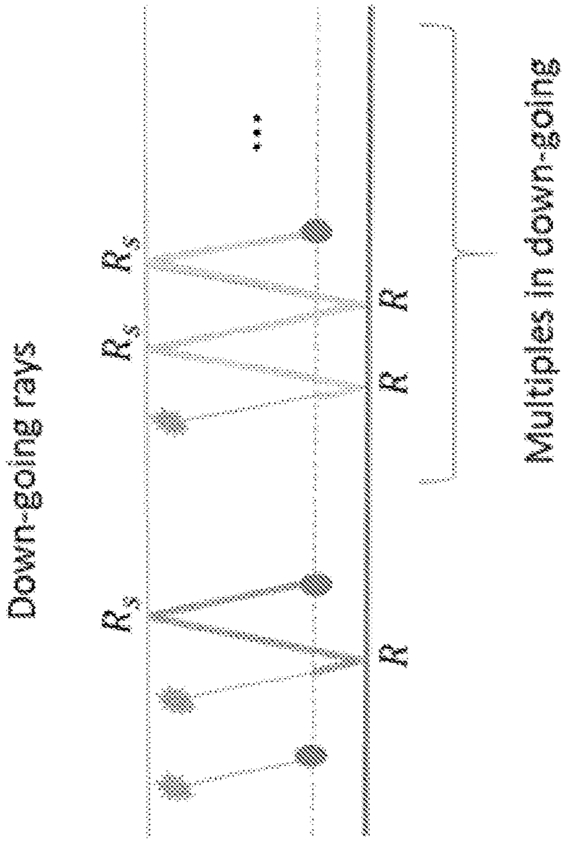

UDD includes considering vertical propagation in a single water layer with a surface reflection coefficient Rs, e.g., a scalar such as −1. UDD also includes a bottom reflection coefficient R. Further, the round-trip in the water delay operator is Z. A schematic representation of the physical upgoing and downgoing wavefields (specifically, one ray thereof) and the reflection coefficients is shown in FIGS. 4A and 4B.

The downgoing (DN) and upgoing (UP) rays that build the total pressure wavefields recorded at the seabed are:

$$DN = DA + DA(RR_sZ) + DA(RR_sZ)^2 + \ldots = \frac{DA}{1 - RR_sZ} \quad (1)$$

-continued $$UP = DAR + DAR(RR_sZ) + DAR(RR_sZ)^2 + \ldots = \frac{DA \times R}{1 - RR_sZ} \quad (2)$$

Here DA represents the downgoing pressure direct arrival event with its source to receiver propagation time, source ghost and source signature (possibly including bubble) effects. Further, equations 1 and 2 are in the z-transform (or Laplace) domain, and products represent time domain convolutions.

In addition, the downgoing direct arrival, upgoing and downgoing wavefields satisfy:

$$DN = DA + R_sZ \times UP \quad (3)$$

Applying a round trip in the water delay to the upgoing wavefield, accounting for the sea surface reflection produces a downgoing wavefield. The downgoing direct arrival may be included separately.

This propagation model is a proxy for the UDD method under the 1D medium assumption as applied to field data. In that case, the terms in equations 1, 2 and 3 are expressed in the plane-wave domain and depend on the frequency and slowness (or wavenumber) 2D coordinates. R represents the medium reflectivity response (a series) for a given plane wave referenced to the recording level, and Z becomes a dip (slowness/wavenumber) dependent extrapolation delay operator.

Assuming both series (1 and 2) can be factorized, the spectral division of UP and DN fields cancels the reverberation operator (hence the multiples) and yields the reflectivity R:

$$R = \frac{UP}{DN} \quad (4)$$

This is the UDD method, and the R (scalar or reflection series) represents the medium response without free surface multiples, without source signature and ghost effects, and with source redatumed at the seabed. The original acquisition source datum may be restored by redatuming.

Several variations of the UDD method have been proposed. Instead of directly estimating the primaries (as in equation 4), the upgoing free surface multiples MULT_UP (with ≥1 bounces off the free surface, as shown in FIGS. 4A and 4B) can be computed from the estimated reflectivity R:

$$\mathrm{MULT\_UP} = DAR(RR_sZ) + DAR(RR_sZ)^2 + \ldots = RR_sZ \times UP \quad (5)$$

The multiples are predicted by a convolution of the estimated reflectivity R (standard UDD) with a propagation model in the water column (Rs and Z) and with the upgoing wavefield. This approach explicitly uses a 1D medium propagation operators in the water layer (namely Rs and Z). Multiples may then be adaptively subtracted from the upgoing wavefield.

Similar developments relate to the downgoing wavefield. The downgoing data may be processed for improved illumination of shallow targets and model building purposes. In this case, the target event is the first downgoing water bounce event: ($RR_SZ$) shown in FIGS. 4A and 4B. Other events in the downgoing wavefield may be considered as noise. Using equation 1, the desired event can be obtained from the downgoing wavefield:

$$RR_sZ=\frac{DN-DA}{DN} \tag{6}$$

This is referred to as the downgoing demultiple method ("DGD"). The deconvolution predicts the first-order multiple bounce without source signature and without ghost effects. This approach calls for knowledge of the downgoing pressure direct arrival DA. For deep water data, careful muting the downgoing arrival may suffice. For shallow water, additional information is called for via, e.g., processing of pressure and vertical velocity component (e.g., cross-ghosting), or the acquisition and processing of near field hydrophone (NFH) recordings with calibrated marine source (CMS) technology, or the modelling of the directional response of the seismic source array.

As for the processing of the upgoing, in some cases the downgoing free surface multiples (with ≥2 bounces off the free surface, as shown in FIG. 1) may be computed. These may be derived from equations 3 and 5:

$$\text{MULT\_DN}=DA(RR_sZ)^2+\ldots=R_sZ\times\text{MULT\_UP} \tag{7}$$

Again, this approach uses a model of the propagation in the water (used twice here).

Data-Driven Multiples Identification

DGD provides the primary event when processing the downgoing wavefield. Equation 6 has two interpretations as the primary event could be obtained from a model-based approach (left side) or a data-driven approach (right side). The model-based approach explicitly uses a 1D propagation model in the water layer (e.g., Rs and 1D medium round trip in water layer extrapolation Z operators) for convolution with the UDD estimated seabed reflectivity R to compute: $RR_SZ$. This approach explicitly uses the 1D water layer assumption and may thus be more sensitive to deviations from it. The second approach estimates the same event but, in this case, the information comes from the data itself: (DN–DA)/DN. The data-driven approach provides further robustness to the prediction of the first multiple bounce and may extend the window of application of the method under the 1D medium assumption of the water layer. The cost of this data-driven approach is the knowledge the down-going direct arrival wavefield.

Regarding the robust prediction of multiples (order≥1), it can be shown (using equations 5 and 6) that the prediction of up-going free surface multiples can be made data-driven:

$$\text{MULT\_UP}=RR_sZ\times UP=\frac{DN-DA}{DN}UP \tag{8}$$

That is, the direct arrivals can be separated from the downgoing wavefield to generate a first "intermediate" wavefield. Then the downgoing wavefield can be deconvolved from the first intermediate product to generate a second intermediate wavefield. The second intermediate wavefield can then be convolved with the upgoing wavefield, yielding the data-driven identification of the upgoing multiples.

The propagation model in the water layer is not explicitly used; rather, the multiples are identified from the data itself: DN-DA, DN and UP fields. This second approach of prediction of upgoing multiples may be more robust to non-1D-medium effects of the water layer, but calls for a priori knowledge of the downgoing direct arrival DA.

Similarly, the downgoing free surface multiple field (order≥2) can be written as (using equations 3, 6 and 8):

$$\text{MULT\_DN}=R_sZ\times\text{MULT\_UP}=\frac{DN-DA}{DN}(DN-DA) \tag{9}$$

The data-driven expression of the downgoing multiples may capture at least some of the wavefield complexity compared to 1D medium model-based approach, which may be desired because the sensitivity of non 1D medium effects may increase with the order of predicted multiple.

Improved prediction of the multiples (equations 8 and 9) may enhance adaptive subtraction, because the adaptive subtraction process is delicate as it attempts to remove the multiples without modifying the primary events. Improving the timing, phase, and amplitude information of the upgoing or downgoing multiples will limit the adaptivity of the process and hence the risk of removal/attenuation of target events.

When using a two-part approach (e.g., multiple prediction and subtraction), the deconvolution process may not provide source designature and deghosting (as per UDD (equation 4) or DGD (equation 6)). However, this can be obtained by a deconvolution with the downgoing direct arrival (DA) in the plane-wave domain. Such a deconvolution provides designature and deghosting functionalities, similar to UDD and DGD. This deconvolution can be applied to the complete upgoing and upgoing multiple wavefields, or to the complete downgoing and downgoing multiple wavefields before multiple subtraction. Alternatively, it could be applied after multiple subtraction.

As noted above, the data-driven estimation of multiples calls for a priori knowledge of the downgoing direct arrival signal. For deep water data, careful muting the down-going arrival may suffice. In other cases, additional information is collected, e.g., by processing of pressure and vertical velocity component (cross-ghosting), or the acquisition and processing of near field hydrophone (NFH) recordings with calibrated marine source (CMS) technology, or the modelling of the directional response of the seismic source array.

Furthermore, the method disclosed herein may also be used to determine whether a 1D medium assumption is appropriate, e.g., to validate the use of the UDD/DGD techniques above. For example, the comparison between the upgoing and downgoing wavefields and the modelling of the upgoing and downgoing free surface multiples may be useful in assessing the complexity of the data and deciding if the data can be processed with a 1D medium assumption.

Equation 8 yields the upgoing multiple with order≥1. The upgoing multiples may also be separated according to their order (or number of bounces off the free surface). For example, using equations 2 and 6, yields:

$$\text{MULT\_UP(order}=1)=DAR(RR_sZ)=DA\left(\frac{UP}{DN}\right)\left(\frac{DN-DA}{DN}\right) \tag{10}$$

-continued $$\text{MULT\_UP(order = 2)} = DAR(RR_sZ)^2 = DA\left(\frac{UP}{DN}\right)\left(\frac{DN-DA}{DN}\right)^2 \quad (11)$$

This progression may continue for sequentially higher-order multiples, e.g., the exponent of the (RRsZ) term increments to match the order. In other words, to estimate the first-order multiples (separately from the second-order multiples), the direct arrivals may be subtracted from the downgoing wavefield to generate a first intermediate wavefield. The downgoing wavefield may be deconvolved from the first intermediate wavefield to generate a second intermediate wavefield. Further, the downgoing wavefield can be deconvolved from the upgoing wavefield to generate a third intermediate wavefield. The direct arrivals can be convolved with the second and third intermediate wavefields to generate the data-driven estimation of the first-order multiples. Further, the estimation of the first-order multiples can be changed to an estimation of second-order multiples by convolving the second intermediate wavefield (as can be seen by the difference between equations 10 and 11). Higher-order multiples estimation can be accomplished by successively convolving the second intermediate wavefield.

Further, in some embodiments, the upgoing multiples may be separated by order, without source ghost and source signature effects (e.g., by deconvolving the direct arrivals) and referenced with both source and receiver at the seabed:

$$\text{MULT\_UP(order = 1)} = R(RR_sZ) = \left(\frac{UP}{DN}\right)\left(\frac{DN-DA}{DN}\right) \quad (12)$$

$$\text{MULT\_UP(order = 2)} = R(RR_sZ)^2 = \left(\frac{UP}{DN}\right)\left(\frac{DN-DA}{DN}\right)^2 \quad (13)$$

The deconvolutions (righthand side of the equations 10-13) employs data-driven operators which are obtained from the decomposed upgoing, downgoing, and downgoing direct arrival wavefields. The first (and/or the second) order upgoing multiple may have a denser angle sampling, similar to imaging of downgoing multiples.

FIG. 5 illustrates a flowchart of a method 500 for generating images from seismic signals that represent a subsurface volume, according to an embodiment. The method 500 may include receiving seismic data, as at 502. The seismic data may include signals recorded using geophones, hydrophones, or any other suitable seismic receivers. In at least some embodiments, the seismic receivers may be positioned at or near a seafloor (ocean bottom, etc.). The seismic receivers may thus be below the surface of the water (ocean, sea, any other body of water). The seismic data may thus include multiples created by signals reflecting from the surface ("free surface").

The seismic data may include an upgoing wavefield and a downgoing wavefield, and the method 500 may include separating (identifying, decomposing, etc.) the upgoing wavefield from the downgoing wavefield, as at 504. In some embodiments, multicomponent measurements may be used to achieve such separation. For example, a hydrophone (P) and vertical geophone/accelerometer (Vz or Az) may be used for the up-down separation; in such case, the projection from the vertical to the actual wavefield direction can be handled in the plane-wave domain or in the time space domain.

Further, direct arrivals in the seismic data, i.e., those signals that proceed directly from the seismic source to the receiver without reflecting, may also be estimated in the seismic data, as at 506. For deep-water data, muting of the downgoing arrivals may be employed. For shallow water, additional information may be collected by, e.g., processing of pressure and vertical velocity component (e.g., cross-ghosting), or the acquisition and processing of near field hydrophone (NFH) recordings with calibrated marine source (CMS) technology, or the modelling of the directional response of the seismic source array.

The method 500 may then proceed in either or both of two conceptual "directions" or legs, as shown in FIG. 5. In the first direction, at block 508, the method 500 may proceed to estimating the first-order multiples using a data-driven approach, as discussed above with respect to, e.g., equation 10. In particular, the first-order multiples may be estimated based on the upgoing wavefield, the downgoing wavefield, and the direct arrivals. Moreover, because the approach employed is data-driven (e.g., right-side of equation 8), the estimation of the multiples may not rely upon a water-propagation model (e.g., no water-propagation model is used for the estimation of first-order and/or other multiples in the upgoing wavefield). Similarly, the method 500, at block 509, may include estimating the second-order multiples, e.g., as discussed above with respect to equation 11. Again, this may be based on the data derived from the seismic signals for the upgoing wavefield, downgoing wavefield, and direct arrivals, and without using or otherwise relying upon a water-propagation model. As discussed above, higher-order multiples may also be calculated based on the progression demonstrated by equations 10 and 11 above.

In some embodiments, source signature and ghosting effects may be removed, as at 510. For example, the direct arrivals, estimated as discussed above, may be deconvolved from the upgoing wavefield, upgoing multiples, downgoing wavefield, and/or downgoing multiples, e.g., as discussed above with reference to equations 12 and 13.

The first and/or second-order multiples in the upgoing wavefield, which are separately identified, e.g., at 508 and 509, whether or not source signature and ghosting effects are removed at 510, may then be imaged, as at 511. As discussed above, the imaging of multiples may provide additional detail, e.g., as to the intrabed (between reflectors) structure, of the subsurface volume. This may enhance the image over those that rely solely on the primary reflections.

In the second direction, returning to the split that is shown in FIG. 5 that occurs after box 506, the method 500 may include estimating the first and higher-order multiples (e.g., as a group, rather than individually). This may proceed using equation 8 as discussed above. Further, source signature and ghosting effects may be removed, in at least some embodiments, as at 513. For example, this may be accomplished by deconvolving the direct arrivals, as discussed above. The identified multiples may then be subtracted (e.g., adaptively subtracted) from the upgoing wavefield, as at 514. In some embodiments, the source signature and ghosting effects removal at 513 may occur after the subtraction at 514.

In some embodiments, the removal of the multiples (in either or both directions of FIG. 5) may be compared to the multiples identified by a water propagation model. If the differences in the multiples (or, similarly, the estimated primaries signal after subtracting the multiples) is below a certain threshold, the water-propagation model may be considered sufficiently accurate to be employed for imaging. If not, the water-propagation model may be modified or not used.

In some embodiments, the upgoing wavefields, downgoing wavefields, and any identified multiple signals can be employed to generate velocity models of the subsurface volume that the seismic data represents. As noted above, the multiple reflection signals can provide enhanced data related to intrabed structure and/or otherwise enhance the identification of the signals in the seismic data. Further, the accurate identification of the multiple reflection signals can permit more accurate identification of the upgoing and downgoing wavefields, e.g., the primary signals thereof. Thus, the velocity model can be enhanced in either or both manners. From the velocity model, seismic images (among other things) can be generated that visually represent the subsurface volume and permit users to make determinations related to operations in the subsurface (e.g., exploration, well planning, drilling equipment adjustments, etc.).

Figure 6:
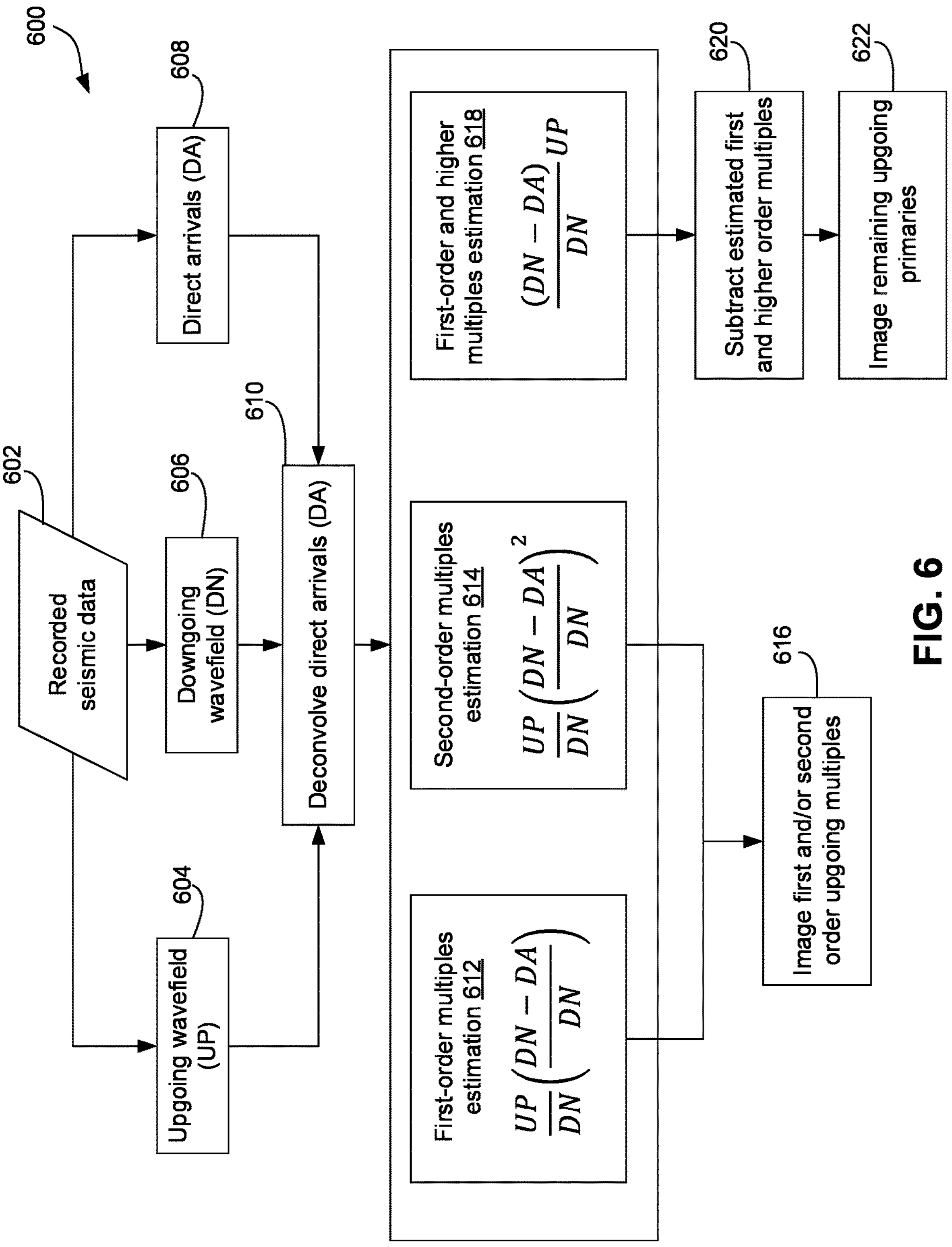
FIG. 6 illustrates a flowchart of a method for seismic imaging one or more upgoing multiples reflection signals, according to an embodiment.

FIG. 6 illustrates a flowchart of a method 600 for generating images from seismic signals that represent a subsurface volume, according to an embodiment. The method 600 may be similar to an embodiment of the method 500, and thus should be considered along therewith. The method 600 may include receiving recorded seismic data, as at 602. The seismic data received at 602 may include an upgoing wavefield (UP), a downgoing wavefield (DN), and direct arrivals (DA). The signals representative of these components may be identified in the data (e.g., "separated"), as indicated at 604, 606, and 608, respectively. The direct arrivals may be deconvolved from the upgoing wavefield, as shown, to remove source signature and ghosting effects. In other embodiments, this block 610 may be skipped.

The method 600 may further include separately estimating first-order multiples at 612 and second-order multiples at 614 in the upgoing wavefield. Such estimation may be data-driven, using the wavefield operators representing the upgoing wavefield, the downgoing wavefield, and the direct arrivals, as discussed above, and using the relationships and equations shown and discussed above. Additionally or alternatively, the method 600 may include estimating first-order and higher-order multiples together, as at 618.

The method 600 may further include imaging the first and/or second-order multiples, as at 616. Additionally or alternatively, the method 600 may include subtracting the multiples (e.g., the first-order and higher-order multiples) as at 620. In some embodiments, the separately identified first and/or second-order multiples may be subtracted separately. In some embodiments, the remaining seismic data, after (e.g., adaptive) subtraction, may be imaged and used to create a visual representation of the subsurface volume represented by the seismic data. Further, in at least some embodiments, the results of the multiples estimation and/or the results after subtracting the multiples may be compared to the results of UDD and/or DGD methods, in order to determine whether a one-dimensional water-propagation assumption is appropriate, or whether it generates a difference that is beyond a threshold, and thus is considered to yield results that are too inaccurate.

Synthetic Data Example

Figure 7A:
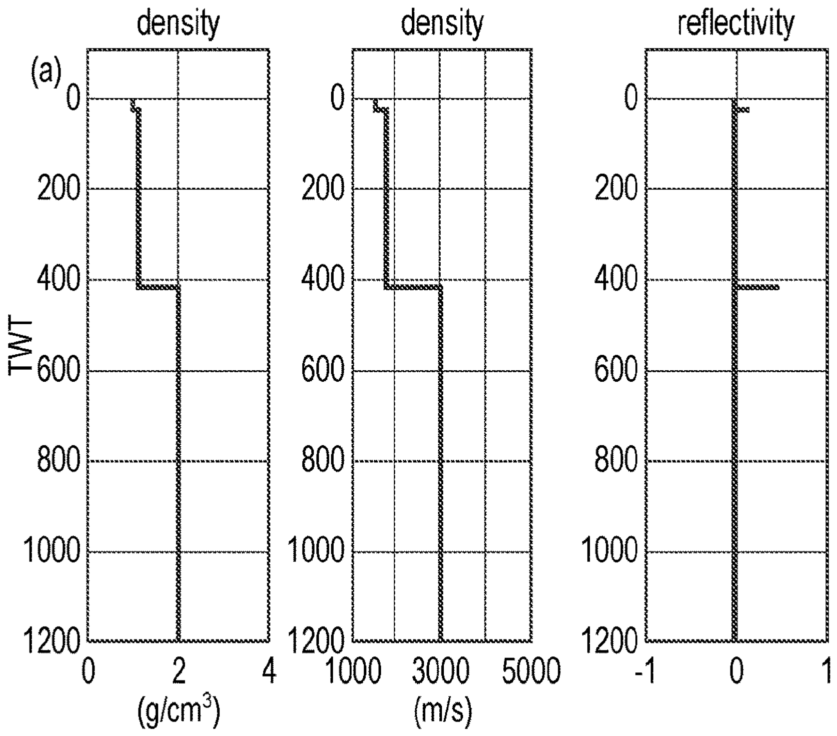
FIG. 7A illustrates example parameters for a model used to generate synthetic data to demonstrate an embodiment of the present disclosure.
Figure 7B:
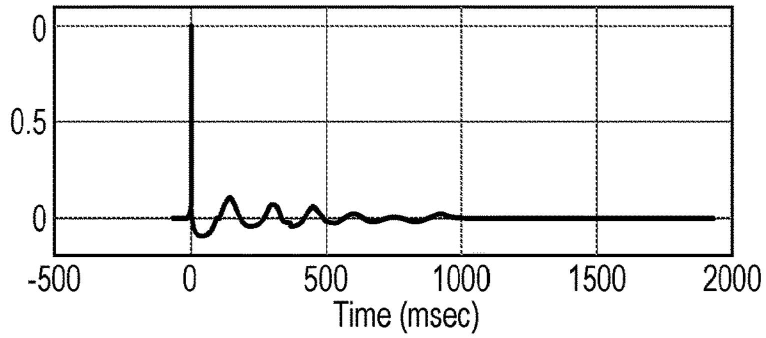
FIG. 7B illustrates a wavelet used to generate the synthetic data.
Figure 7C:
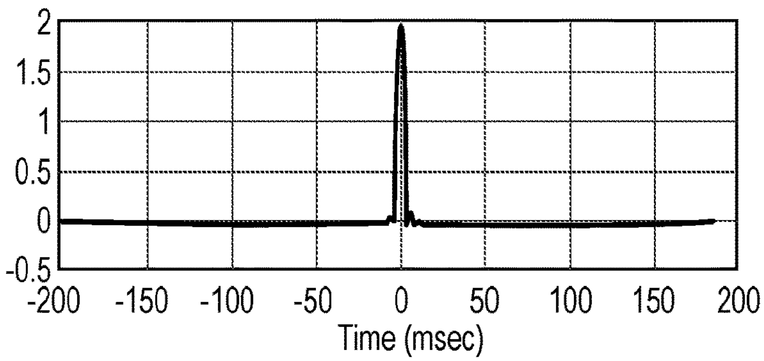
FIG. 7C illustrates the wavelet after designature.

An embodiment of the present disclosure may be understood in view of the following non-limiting example related to deghosting and designature operations. More particularly, the model-based and data-based approaches for predicting upgoing and downgoing multiples are illustrated with a simple synthetic data example. FIG. 7A illustrates example parameters for a model used to generate the synthetic data. FIG. 7B illustrates a wavelet used to generate the synthetic data. FIG. 7C illustrate the wavelet after designature.

Figure 8:
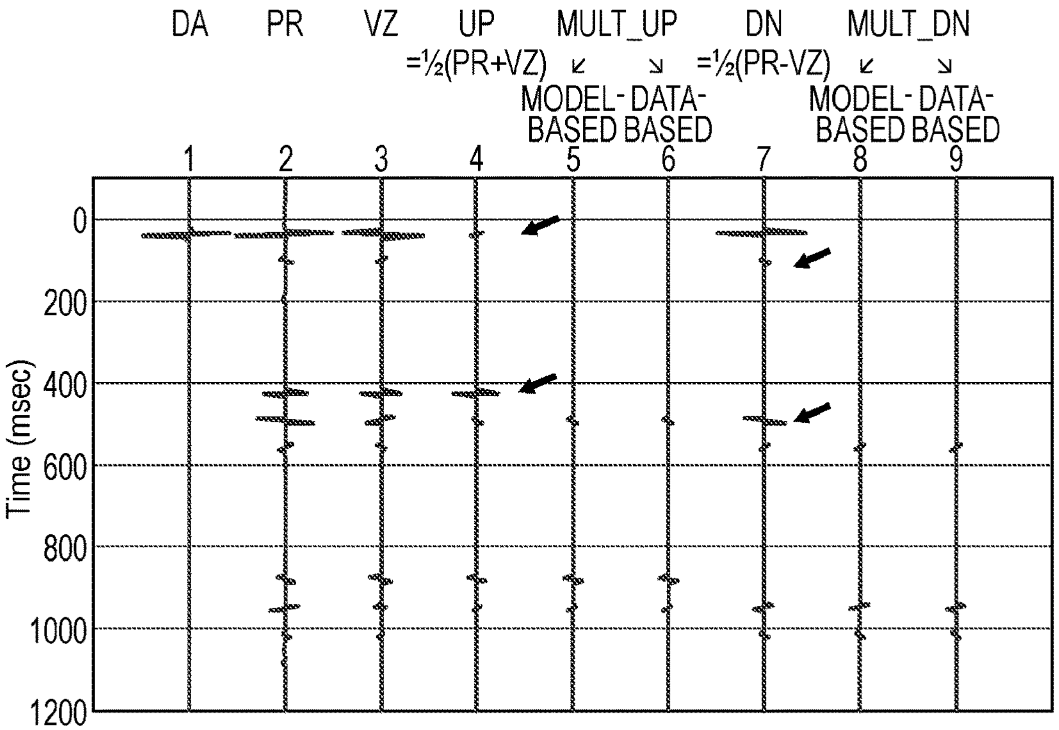
FIG. 8 illustrates a plot of model data, showing downgoing direct arrival, pressure and vertical velocity components, upgoing wavefield with both model-based, and data-driven estimated free surface multiples, according to an embodiment.

The data may be modeled assuming vertical propagation in a shallow water model with two primary reflections (FIG. 7A). The source is at 5 m depth and the receiver is on the seabed at 50 m depth. The data is modeled with a realistic source signature (FIG. 7B). FIG. 8 illustrates a plot of model data, showing down-going direct arrival (for example estimated from pressure and vertical velocity cross-ghosting), pressure and vertical velocity components, upgoing wavefield with both model-based and data-based estimated free surface multiples. The same wavefields are shown for the downgoing wavefield. Arrows point to the target events when processing upgoing or downgoing wavefield. All traces have a same display amplitude.

Water column multiples and source and receiver side peg-leg multiple signals are related to the deeper primary and are separated in time. Source bubble and ghost effects are also included. The upgoing and downgoing wavefields are computed from a combination of the pressure and vertical velocity components. The arrows indicate the target events (or primaries) when processing the up- or downgoing wavefields.

The upgoing and downgoing multiples have been estimated twice, once with a model-based approach (equations 6 and 7) and once with a data-based approach (equations 8 and 9). Both approaches are equivalent for this simple model but are expected to differ on field data where the data-based approach may provide a more accurate estimation of the multiples.

Figure 9:
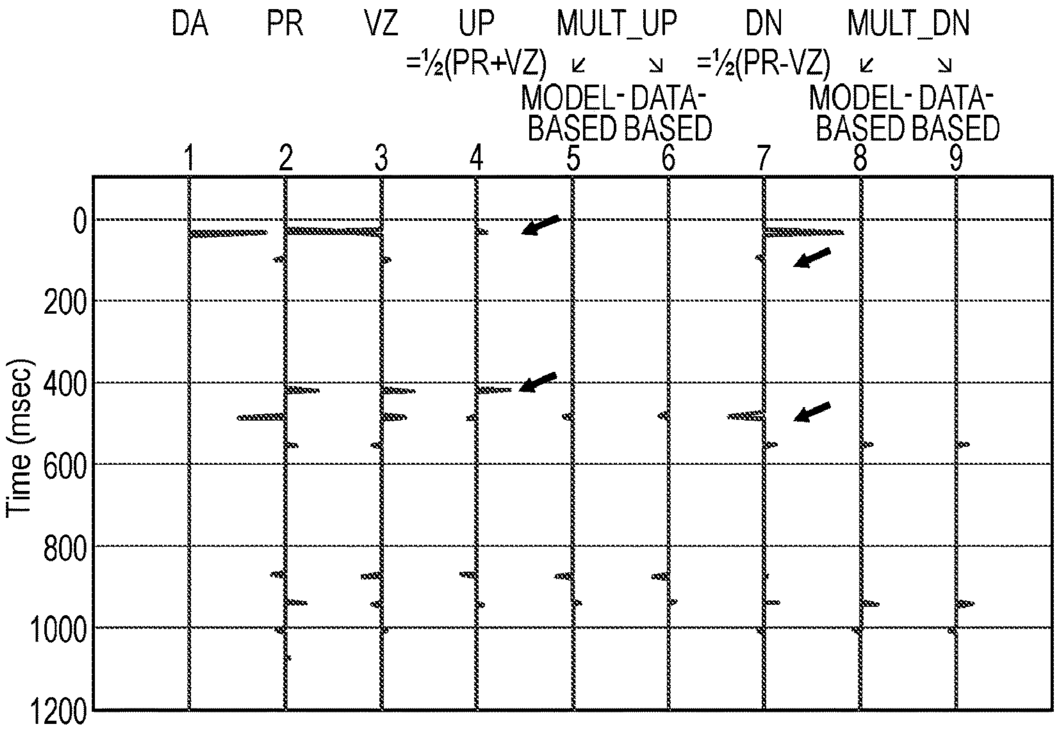
FIG. 9 illustrates the same plot as FIG. 8, after source signature and ghosting effects have been removed, according to an embodiment.

FIG. 9 is the same as FIG. 8, but after designature by convolving the downgoing direct arrival wavefield (FIG. 9 leftmost trace) and re-signature with the wavelet shown in FIG. 7C. Source ghost and bubble effects have been removed in the wavefields.

Computing Environment

In one or more embodiments, the functions described can be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

Figure 10:
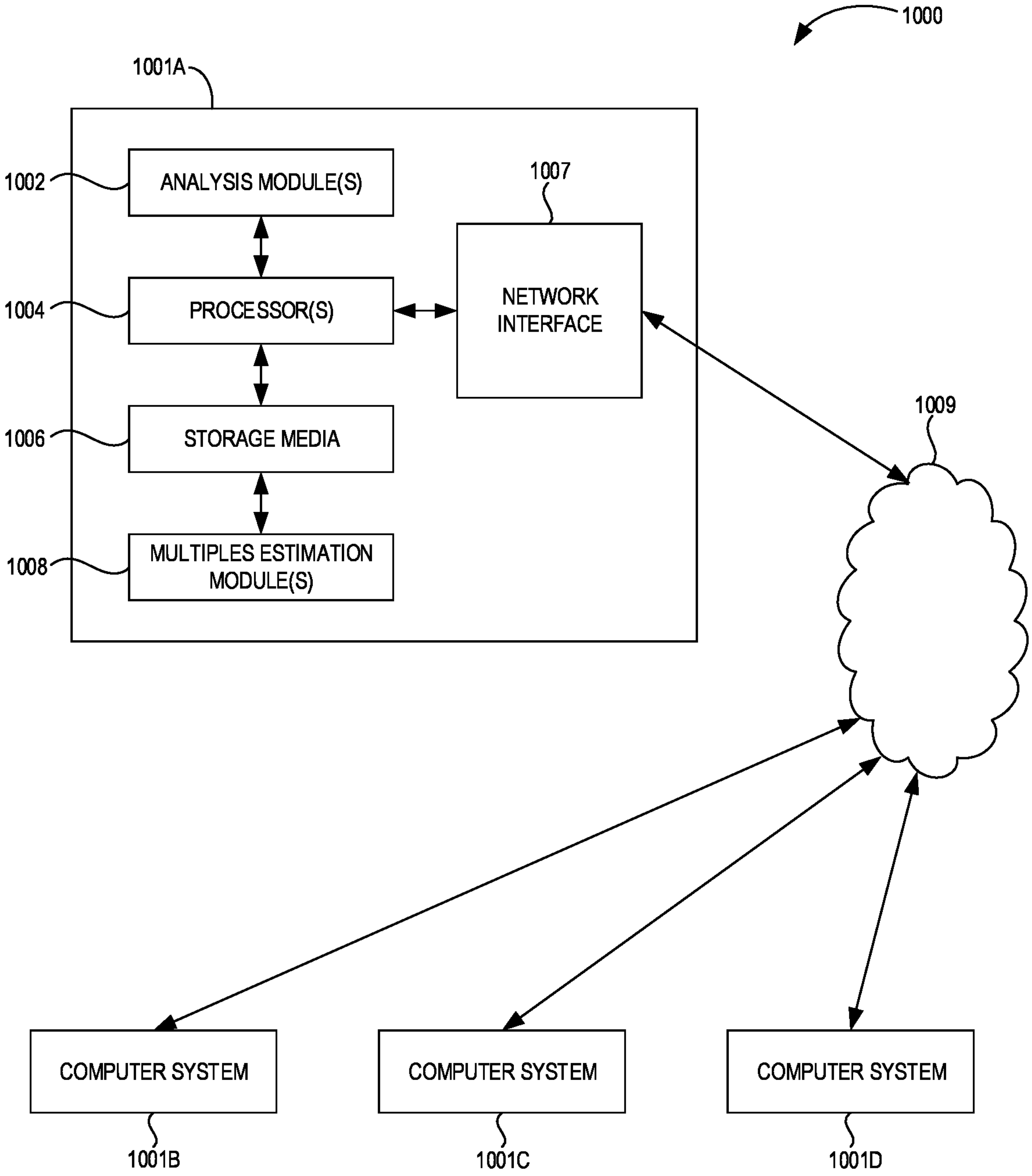
FIG. 10 illustrates a schematic view of a computing system, according to an embodiment.

In some embodiments, any of the methods of the present disclosure may be executed by a computing system. FIG. 10 illustrates an example of such a computing system 1000, in accordance with some embodiments. The computing system 1000 may include a computer or computer system 1001A, which may be an individual computer system 1001A or an arrangement of distributed computer systems. The computer system 1001A includes one or more analysis module(s) 1002 configured to perform various tasks according to some embodiments, such as one or more methods disclosed herein. To perform these various tasks, the analysis module 1002 executes independently, or in coordination with, one or more processors 1004, which is (or are) connected to one or more storage media 1006. The processor(s) 1004 is (or are) also connected to a network interface 1007 to allow the computer system 1001A to communicate over a data network 1009 with one or more additional computer systems and/or computing systems, such as 1001B, 1001C, and/or 1001D (note that computer systems 1001B, 1001C and/or 1001D may or may not share the same architecture as computer system 1001A, and may be located in different physical locations, e.g., computer systems 1001A and 1001B may be located in a processing facility, while in communication with one or more computer systems such as 1001C and/or 1001D that are located in one or more data centers, and/or located in varying countries on different continents).

A processor can include a microprocessor, microcontroller, processor module or subsystem, programmable integrated circuit, programmable gate array, or another control or computing device.

The storage media 1006 can be implemented as one or more computer-readable or machine-readable storage media. Note that while in the example embodiment of FIG. 10 storage media 1006 is depicted as within computer system 1001A, in some embodiments, storage media 1006 may be distributed within and/or across multiple internal and/or external enclosures of computing system 1001A and/or additional computing systems. Storage media 1006 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 1000 contains one or more multiples estimation module(s) 1008. In the example of computing system 1000, computer system 1001A includes the multiples estimation module 1008. In some embodiments, a single multiples estimation module may be used to perform some or all aspects of one or more embodiments of the methods. In alternate embodiments, a plurality of multiples estimation modules may be used to perform some or all aspects of methods.

It should be appreciated that computing system 1000 is only one example of a computing system, and that computing system 1000 may have more or fewer components than shown, may combine additional components not depicted in the example embodiment of FIG. 10, and/or computing system 1000 may have a different configuration or arrangement of the components depicted in FIG. 10. The various components shown in FIG. 10 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 1000, FIG. 10), and/or through manual control by a user who may make determinations regarding whether a given step, action, template, model, or set of curves has become sufficiently accurate for the evaluation of the subsurface three-dimensional geologic formation under consideration.

Further, it will be appreciated that the steps of the methods disclosed herein may be performed in the order in which they are described, or performed in a different order, without departing from the scope of the present disclosure. Further, the steps may be combined, separated, or performed in parallel or simultaneously, consistent with the present disclosure.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:

receiving seismic data comprising signals collected using a receiver, the seismic data representing a subsurface volume;

identifying a downgoing wavefield and an upgoing wavefield in the seismic data;

identifying direct arrivals in the downgoing wavefield;

estimating at least first-order multiple reflection signals in the upgoing wavefield based on the downgoing wavefield, the upgoing wavefield, and the direct arrivals, wherein estimating the at least first-order multiple reflection signals comprises estimating first and higher multiple reflection signals by:

generating an intermediate wavefield by subtracting the direct arrivals from the downgoing wavefield;

deconvolving the downgoing wavefield from the intermediate wavefield to generate a second intermediate wavefield; and convolving the second intermediate wavefield with the upgoing wavefield; and generating seismic images representing the subsurface volume based at least in part on the at least first-order multiple reflection signals.

2. The method of claim 1, further comprising removing source signature and ghosting effects in the at least first-order multiple reflection signals by deconvolving the direct arrivals.

3. The method of claim 1, further comprising adaptively subtracting the at least first-order multiple reflection signals from the upgoing wavefield, wherein the seismic images are generated at least partially from a remainder of the upgoing wavefield after the at least first-order multiple reflection signals are subtracted from the upgoing wavefield.

4. The method of claim 1, further comprising comparing the at least first-order multiple reflection signals with modeled at least first-order multiple reflection signals generated using a water-propagation model, and determining whether the water-propagation model is accurate based on the comparing.

5. The method of claim 1, wherein subtracting the direct arrivals comprises direct muting of the direct arrivals in the downgoing wavefield.

6. The method of claim 1, wherein estimating the at least first-order multiple reflection signals is data-driven and does not rely on a water-propagation model, and wherein the seismic images that are generated do not include primary reflections.

7. The method of claim 1, further comprising generating a velocity model representing a subterranean domain using the at least first-order multiple reflection signals.

8. A non-transitory computer-readable medium storing instructions that, when executed by at least one processor of a computing system, cause the computing system to perform operations, the operations comprising:

receiving seismic data comprising signals collected using a receiver, the seismic data representing a subsurface volume;

identifying a downgoing wavefield and an upgoing wavefield in the seismic data;

identifying direct arrivals in the downgoing wavefield;

estimating at least first-order multiple reflection signals in the upgoing wavefield based on the downgoing wavefield, the upgoing wavefield, and the direct arrivals, wherein estimating the at least first-order multiple reflection signals comprises:

subtracting the direct arrivals from the downgoing wavefield to generate a first intermediate wavefield;

deconvolving the downgoing wavefield from the first intermediate wavefield to generate a second intermediate wavefield;

deconvolving the downgoing wavefield from the upgoing wavefield to generate a third intermediate wavefield; and convolving the direct arrivals, the second intermediate wavefield, and the third intermediate wavefield, so as to estimate the at least first-order multiple reflection signals in the upgoing wavefield; and generating seismic images representing the subsurface volume based at least in part on the at least first-order multiple reflection signals.

9. The medium of claim 8, wherein the operations further comprise removing source signature and ghosting effects in the at least first-order multiple reflection signals by deconvolving the direct arrivals.

10. The medium of claim 8, wherein estimating the at least first-order multiple reflection signals comprises estimating second-order multiple reflection signals separately from estimating the at least first-order multiple reflection signals.

11. The medium of claim 8, wherein the operations further comprise adaptively subtracting the at least first-order multiple reflection signals from the upgoing wavefield, wherein the seismic images are generated at least partially from a remainder of the upgoing wavefield after the at least first-order multiple reflection signals are subtracted from the upgoing wavefield.

12. The medium of claim 8, wherein the operations further comprise comparing the at least first-order multiple reflection signals with modeled at least first-order multiple reflection signals generated using a water-propagation model, and determining whether the water-propagation model is accurate based on the comparing.

13. The medium of claim 8, wherein estimating the at least first-order multiple reflection signals is data-driven and does not rely on a water-propagation model, and wherein the seismic images that are generated do not include primary reflections.

14. The medium of claim 8, wherein the operations further comprise generating a velocity model representing a subterranean domain using the at least first-order multiple reflection signals.

15. A computing system, comprising:

one or more processors; and a memory system including one or more non-transitory computer-readable media storing instructions that, when executed by at least one of the one or more processors, cause the computing system to perform operations, the operations comprising:

receiving seismic data comprising signals collected using a receiver, the seismic data representing a subsurface volume;

identifying a downgoing wavefield and an upgoing wavefield in the seismic data;

identifying direct arrivals in the downgoing wavefield;

estimating at least first-order multiple reflection signals in the upgoing wavefield based on the downgoing wavefield, the upgoing wavefield, and the direct arrivals, wherein estimating the at least first-order multiple reflection signals comprises estimating first and higher multiple reflection signals by:

generating an intermediate wavefield by subtracting the direct arrivals from the downgoing wavefield;

deconvolving the downgoing wavefield from the intermediate wavefield to generate a second intermediate wavefield; and convolving the second intermediate wavefield with the upgoing wavefield; and generating seismic images representing the subsurface volume based at least in part on the at least first-order multiple reflection signals.

* * * * *